Dec. 8, 1970    J. L. McCORD ET AL    3,545,290
REMOTELY CONTROLLED VEHICLE MIRROR
Filed May 21, 1968    2 Sheets-Sheet 1
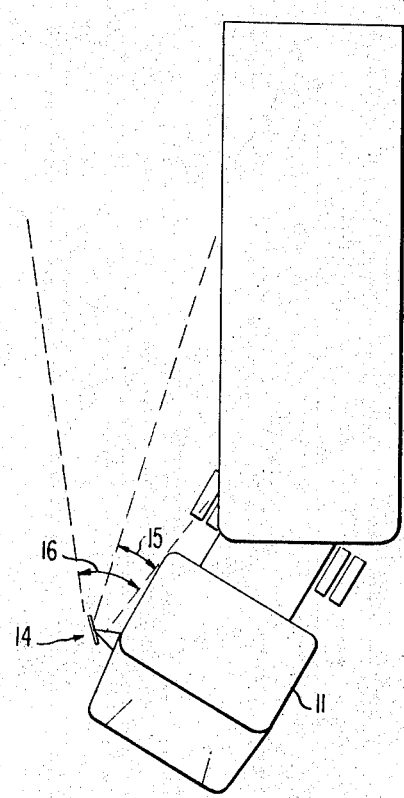
FIG.1
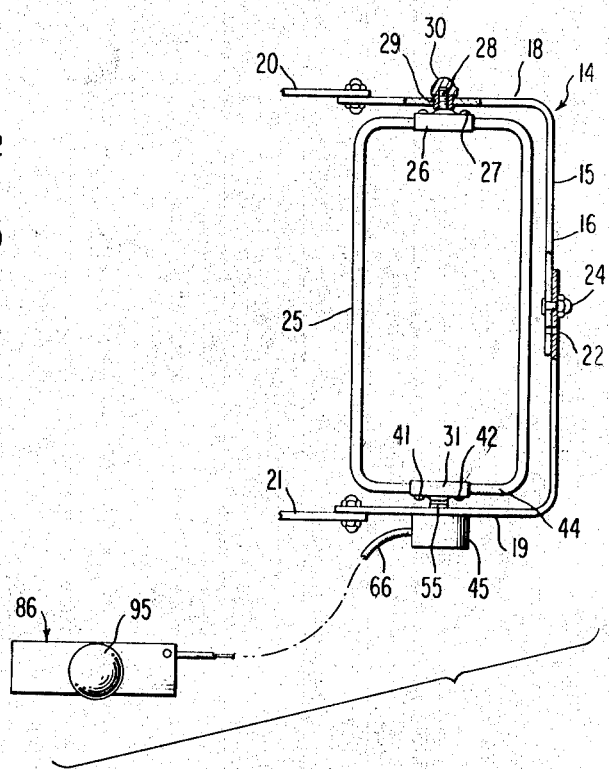
FIG.2
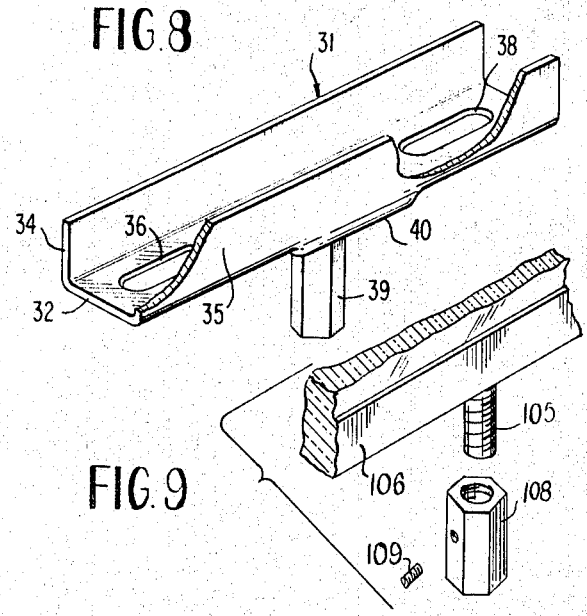
FIG.8
FIG.9
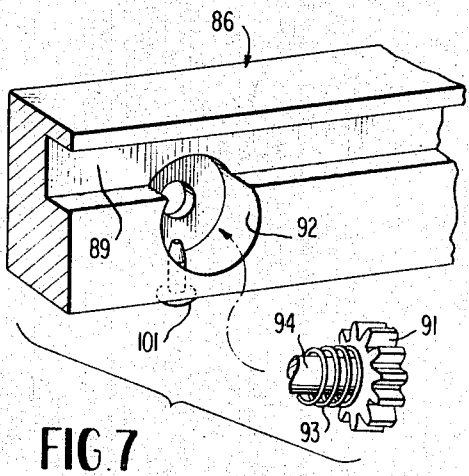
FIG.7
INVENTORS
Jesse L. McCord
Carl Heinle, Jr.
BY Jones & Thomas
ATTORNEYS

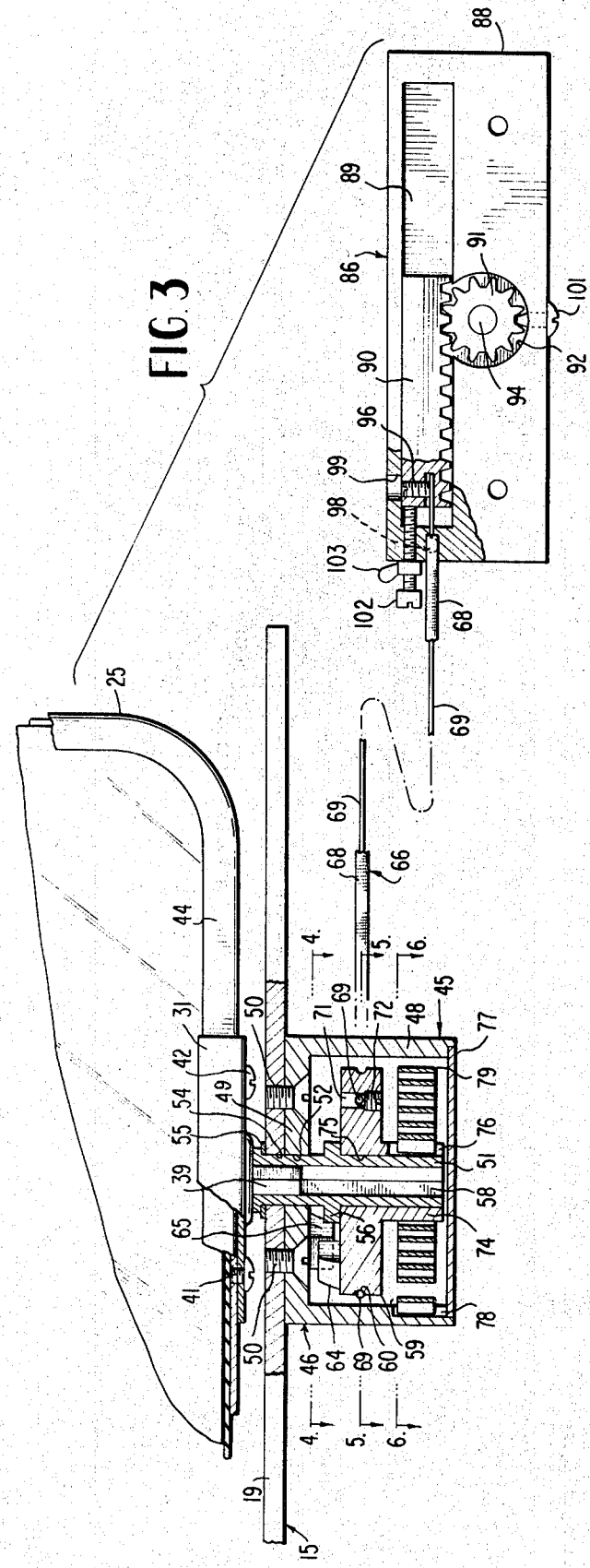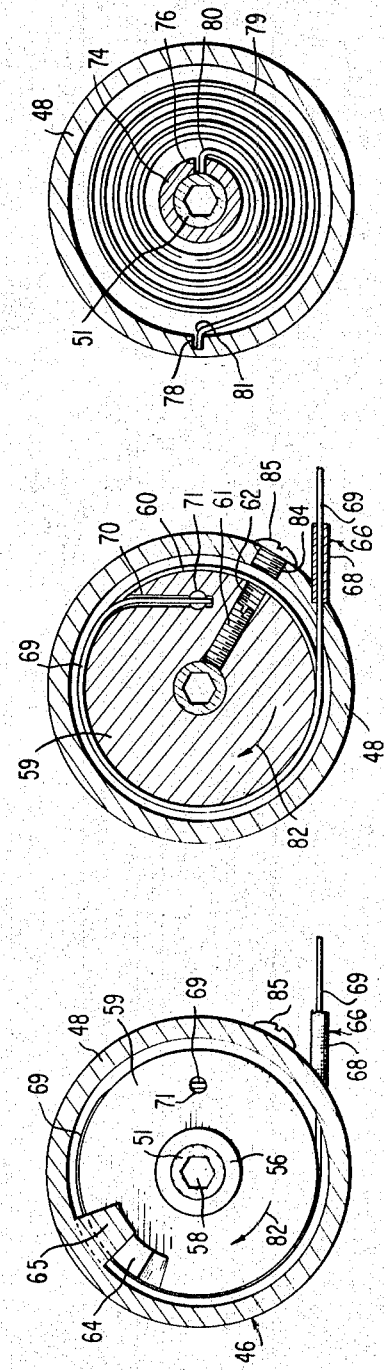

United States Patent Office 3,545,290
Patented Dec. 8, 1970

3,545,290
REMOTELY CONTROLLED VEHICLE MIRROR
Jesse L. McCord, Covington, Ga., and Carl Heinle, Jr., 962 Canterbury Road NE., Atlanta, Ga. 30324; said McCord assignor to said Heinle
Filed May 21, 1968, Ser. No. 730,769
Int. Cl. F16h *21/40*
U.S. Cl. 74—98         7 Claims

ABSTRACT OF THE DISCLOSURE

A remotely controlled vehicle mirror assembly comprising a frame connected to the vehicle for supporting a mirror head, a servo mechanism connected to the frame, and a bracket connectable to the mirror head and including a stud inserted into the servo mechanism. A control mechanism is positioned inside the vehicle and functions to actuate the servo mechanism. The control mechanism includes a rotatable knob which is lockable into various positions, and a rack engaging the knob. A Bowden wire extends between the control mechanism and the servo mechanism, and functions to transmit the movement of the rack of the control mechanism to the servo mechanism, which functions to rotate the bracket, and the mirror received in the bracket.

BACKGROUND OF THE INVENTION

The driver of a tractor truck usually has a "blind" area of vision which extends through an arc from the right side of the cab toward the rear of the truck. Of course, most trucks have rear view mirrors positioned on the right side of the cab so that the driver can see behind the trailer on the right side of the trailer; however, the arc of vision is usually limited to an area extending directly behind the cab of the truck, which leaves a significant blind area to the right and to the rear of the cab. When the truck is in a right hand turn, the blind area is increased since the cab and trailer extend at an angle with respect to each other which functions to limit the view from the right hand mirror to only the trailer, thus blocking the view beyond the trailer.

When a trailer truck is being backed up, it is important, yet virtually impossible for the driver of the truck to view the area toward the right rear of the truck as he sits in the drivers seat. The driver must either frequently leave the driver's seat to see where he is backing his truck, or have a helper to watch him as he backs the truck.

In order that the driver of a trailer truck or other similar large truck be able to view the area toward the right rear of his truck, it is necessary for him to utilize a pivotal mirror on the right side of the cab. Various pivotal mirror assemblies have been developed, including that disclosed in Pat. No. 3,238,800, and the present invention comprises a significant improvement over these previously known devices.

SUMMARY OF THE INVENTION

Briefly described, the present invention comprises a remotely cotnrolled vehicle mirror assembly which includes a frame mounting assembly adjustable in size to receive all popular sized mirror heads presently being manufactured. The assembly includes a control mechanism positionable inside the cab of the vehicle, and a servo mechanism connectable to the mirror head. The servo mechanism includes a bracket which is connectable to virtually any shaped mirror head, so that the mirror heads being utilized on a nonpivotal mirror assembly can be utilized when the assembly is converted to a pivotal assembly.

Thus, it is an object of this invention to provide a remotely controlled vehicle mirror assembly for use with large vehicles, the mirror head of which is pivotal about an upwardly extending axis so that the driver of the vehicle can see through a wide arc behind the vehicle.

Another object of this invention is to provide a remotely controlled vehicle mirror support assembly which is connectable to existing mirror mountings and utilizes existing mirror heads.

Another object of this invention is to provide a remotely controlled vehicle mirror assembly which includes a mirror head pivotal about a vertical axis to various angles with respect to its vehicle, which can be locked into various positions, and which returns to a fixed position, when desired.

Another object of this invention is to provide a remotely controlled vehicle mirror assembly which is inexpensive to manufacture, durable, simple to operate, and convenient to install.

Other objects, features an advantages of the present invention will become apparent upon reading the following specification, when taken in conjunction with the accompanying drawing.

BRIEF DESCRIPTION OF THE DRAWING

FIG. 1 is a top view of a trailer truck, showing the fields of vision of a conventoinal mirror and the mirror of the present invention.

FIG. 2 is an elevational view of the remotely controlled vehicel mirror, with parts broken away.

FIG. 3 is a partially elevational view of the remotely controlled vehicle mirror assembly.

FIG. 4 is a cross-sectional view of the servo mechanism, taken along lines 4—4 of FIG. 3.

FIG. 5 is a cross-sectional view of the servo mechanism, taken along lines 5—5 of FIG. 3.

FIG. 6 is a cross-sectional view of the servo mechanism taken along lines 6—6 of FIG. 3.

FIG. 7 is a partial exploded view of the control mechanism.

FIG. 8 is a perspective view of the mirror mounting bracket.

FIG. 9 is a partial perspective exploded view of the bottom of a mirror head and a hexagonal nut.

DESCRIPTION OF THE PREFERRED EMBODIMENTS

Referring now more particularly to the drawing, in which like numerals indicate like parts throughout the several views, FIG. 1, shows a trailer truck 10 which includes a tractor or cab 11 and trailer 12. Remotely controlled vehicle mirror assembly 14 is connected to the right side of cab 11. A conventional mirror assembly connected to cab 11 in this position would view toward the rear of cab 11 through the arc indicated by numeral 15. With the use of the mirror assembly of this invention, the driver can view toward the rear of cab 11 through an arc indicated by numeral 16. Thus, the field of vision is significantly increased by the use of a pivotal mirror assembly.

Mirror assembly 14 includes a U-shaped frame 15 having an upwardly extending leg 16 and laterally extending upper and lower legs 18 and 19. Legs 18 and 19 are connectable at their ends to conventional mirror mounting supports 20 and 21 respectively. Upwardly extending leg 16 of frame 15 is formed in two pieces, which overlap and define alignable apertures 22. A bolt 24 extends through the aligned apertures 22 to hold the portions of leg 16 together. This arrangement functions to lengthen or shorten leg 16 of frame 15 to accommodate mirror heads of various heights.

Mirror head 25 is supported by frame 15, from upper and lower legs 18 and 19. Support bracket 26 is connected to the upper edge of mirror head 25, and threaded stud 28 extends upwardly from mirror head 25 through an aperture in upper leg 18 of frame 15. Bearing sleeve 29 surrounds the threads of stud 28 in the vicinity of upper leg 18, and nut 30 is threaded onto stud 28 above leg 18. Thus, leg 18 pivotally supports mirror head 25.

Bracket 31 is connected to the bottom edge of mirror head 25. Bracket 31 (FIG. 8) is generally similar in shape to bracket 26, and includes lateral leg 32 and upwardly turned flanges 34 and 35. Lateral leg 32 defines elongated openings or slots 36 and 38 in its end one third (⅓) portion, and stud 39 extends in a downward direction from lateral leg 32, in its central one third (⅓) portion. The central one third (⅓) portion of lateral leg 32 is recessed downwardly to form an external protrusion 40 above stud 39. Thus, the lower surface of lateral leg 32 is offset upwardly in its end one third (⅓) portion from its lower surface in its central one third (⅓) portion. Stud 39 is hexagonal in cross-section. The space between upwardly turn flanges 34 and 35 is approximately equal to the thickness of the margin of mirror head 25, so that the margin of mirror head 25 can be received in bracket 31. As is shown in FIG. 3, bracket 31 is connected to mirror head 25 by means of screws 41 and 42 extending through slots 36 and 38 into apertures in the frame 44 of mirror head 25.

Servo mechanism 45 includes housing 46 which has a circular or annular side wall 48 and a flat or disc shaped top wall 49. Cap screws 50 extend through top wall 49 and into bottom leg 19 of frame 15 to connect housing 46 to frame 15.

Connecting spool 51 extends through aperture 52 which is centrally located top wall 49 of servo housing 46, and through aperture 54 in lower leg 19 of frame 15. The upper end of connecting spool 51 protrudes slightly beyond lower leg 19, and defines an annular groove in its protruding portion into which snap ring 55 is inserted. Thus, snap ring 55 functions to hold connecting spool 51 in the position as shown in FIG. 3.

Connecting spool 51 is generally circular in outside cross-sectional configuration and includes positioning flange 56 intermediate its ends. Internal bore 58 extends entirely through connecting spool 51, and is hexagonal in cross-sectional configuration, and sized to fit about stud 39 of bracket 31.

Pulley 59 extends about connecting spool 51 and defines peripheral groove 60. As is shown in FIG. 5, pulley 59 is fixedly connected to connecting spool 51 by means of set screw 61 extending through its bore 62 of pulley 59. Upwardly extending stop protrusions 64 protrudes from the upper surface of pulley 59 while downwardly extending stop protrusion 65 extends downwardly from the lower surface of housing top wall 49. Stop protrusions 64 and 65 are positioned and dimensioned to engage each other to prevent pulley 59 from rotating within servo housing 46 beyond a predetermined position.

As is shown in FIG. 5, Bowden wire 66 is connected to servo mechanism 45. Bowden wire includes tube 68 and inner wire 69. Tube 68 extends through an opening in annular side wall 48, while wire 69 extends into housing 46, around pulley 59 in its annular groove 60, into bore 70 which extends into pulley 59 from its periphery. Intersecting bore 71 extends from the top to the bottom surfaces of pulley 59 and intersects bore 70. Set screw 72 is threaded into intersecting bore 71 and engages the end of wire 69, to lock wire 69 to pulley 59. Thus, movement of wire 69 in a direction away from housing 46 causes pulley 59 and connecting spool 51 to rotate within housing 46.

Boss 74 extends downwardly from the lower surface of pulley 59 about the center opening 75 of the pulley. Boss 74 is split at 76 along its length, and slot 78 is defined in the internal surface of annular side wall 48 of servo housing 46. Coiled flat spring 79 extends about boss 74 within housing 46, and its ends 80 and 81 are inserted into split 76 and slot 78 respectively. The tension of spring 79 is such that pulley 59 is urged in the direction as indicated by arrow 82, so that stop protrusion 64 of pulley 59 normally engages stop protrusion 65 of housing 46.

As is shown in FIG. 5, annular side wall 48 of housing 46 defines aperture 84 which is normally plugged by screw 85. Aperture 84 is positioned so that it is in alignment with set screw aperture 62 of pulley 59 when stop protrusion 64 of pulley 59 engages stop protrusion 65 of housing 46. Thus, when screw 85 is removed from its aperture 84 in annular side wall 48, set screw 61 can be reached from outside housing 46 with a screw driver or Allen wrench.

As is shown in FIGS. 2, 3 and 7, control mechanism 85 is positionable within cab 11 of trailer truck 10, and includes housing 88 which defines rectangular slot 89. Rack 90 is positioned in slot 89 and its movable along the length of the slot. Pinion 91 is received in cresent shaped recess 92 which intersects slot 89. Axle 94 of pinion 91 extends outside housing 86, and knob 95 (FIG. 2) is connected to axle 94, so that pinion 91 can be rotated from without housing 86. Coil spring 93 surrounds axle 94 and lightly urges axle 94 and knob 95 toward housing 88. Wire 69 of Bowden wire 66 is connected at its end to rack 90 by means of set screw 96. Tube 68 of Bowden wire 66 is connected to housing 86 by means of set screw 98. Thus, movement of rack 90 within its slot 89 results in a corresponding movement of wire 69 within its tube 68. Aperture 99 extends through housing 86 and intersects slot 89. Aperture 99 is positioned so that when rack 90 is moved to the left (FIG. 3) within slot 89, set screw 96 of rack 90 can be reached through aperture 99 from without housing 86.

The thickness of sprocket 91 is less than the depth of cresent shaped slot 92 of housing 88 so that when axle 94 is pulled or pushed from exteriorly of housing 86 by knob 95 sprocket 91 moves axially within housing 88. As is shown in FIG. 7, housing 88 defines a threaded aperture through which locking screw 101 extends. Locking screw 101 projects into recess 92 and sprocket 91 can be urged against the bias of its spring 93 to move to a position where adjacent ones of its teeth will extend on opposite sides of locking screw 101 to hold sprocket 91 in nonrotating relationship with housing 88. There are twelve teeth and twelve spaces on sprocket 91. Therefore, sprocket 91 is lockable with respect to housing 88 at thirty degree intervals by pulling on knob 95 or sprocket 91 can be unlocked to rotate within housing 86 by pushing on knob 95.

Sprocket 91 is of a diameter approximately equal to one third (⅓) the diameter of pulley 59. Thus, the rotation of sprocket 91 through a given angle results in a rotation of pulley 59 through an angle corresponding to one third (⅓) the angle of rotation of sprocket 91. Thus, since sprocket 91 is lockable with respect to housing 88 at 30 degrees angles, mirror head 25 can be locked at 10 degrees intervals about its vertical axis.

Fine adjusting screw 102 (FIG. 3) extends through housing 88 at a position adjacent Bowden wire 66, and can be rotated to move into or out of slot 89, to control the set position of rack 90. Wing nut 103 acts as a lock screw to hold fine adjusting screw in locked relationship with housing 88.

As is shown in FIG. 9, an existing threaded stud 105 of a mirror head 106 can be fitted with an internally threaded stud adapter 108 instead of removing the threaded stud 105 and replacing it with the bracket of FIG. 8. Adapter 108 is threaded onto the threaded stud and locked thereto by its set screw 109. This arrangement is convenient when the threaded stud of a mirror head is difficult or inconvenient to remove.

OPERATION

When the remotely controlled vehicle mirror is to be mounted on a vehicle, it can be connected to supports 20 and 21 (FIG. 2) which are already present on the vehicle and which were utilized for mounting a non-rotatable mirror assembly, and the mirror head utilized with the non-rotatable assembly can be utilized with the support and control assembly disclosed herein. Bracket 26 is connected to the upper margin of mirror head 25 by means of its cap screws 27, and bracket 31 is connected to the lower margin of mirror head 25 by means of its cap screws 42. Hexagonal stud 39 of bracket 31 is then inserted through aligned apertures 52 and 54 of servo mechanism 45 and lower leg of frame 15, and stud 28 and its bushing 29 are inserted through the opening in upper leg 18 of frame 15. The height or opening of frame 15 is adjusted as necessary by means of aligning apertures 22 of leg 16 of frame 15 and inserting bolt 24 through the aligned apertures. Nut 30 is threaded onto stud 28 of upper bracket 26. Thus, mirror head 25 is confined within frame 25.

Bowden wire 66 which extends from servo mechanism 45 is extended into cab 11 of trailer truck 10. Housing 88 of control mechanism 86 is connected to the desired location on the dashboard of cab 11. Bowden wire 66 is then extended to control mechanism 86, and tube 68 is trimmed so that it extends into housing 88 toward slot 89. Set screw 98 is screwed into housing 88 until it engages tube 68, whereupon tube 68 is rigidly connected to housing 88 of control mechanism 86. Since spring 79 of servo mechanism 45 causes stop protrusions 64 and 65 to engage each other, wire 69 of Bowden wire 66 will be fully retracted within housing 46 of servo mechanism 45. The portion of wire 69 extending through tube 68 into slot 89 of control mechanism 86 will be trimmed so that it extends slightly beyond aperture 99. Knob 95 is then rotated to move rack 90 to a position where its set screw 96 is in alignment with aperture 99 of housing 88. Wire 69 then protrudes into the opening of rack 90 beyond set screw 96, and a tool, such as a screw driver or Allen wrench, is inserted through aperture 99 from without housing 88 to engage set screw 96 and rotate set screw 96 into engagement with wire 69. This locks wire 69 to rack 90. Thus, remotely controlled vehicle mirror assembly 14 is properly connected to cab 11.

When the driver desires to rotate mirror head 25 to increase his arc of vision as shown by numeral 16 of FIG. 1, he merely rotates knob 95 counterclockwise (FIG. 2), which moves rack 90 away from servo mechanism 45. Since wire 69 of Bowden wire 66 is carried by rack 90, movement of rack 90 causes corresponding movement of pulley 59. Since pulley 59 is connected to connecting spool 51 by means of set screw 61, connecting spool 51 will also be rotated a corresponding amount. Since hexagonal stud 39 of bracket 31 is inserted into the hexagonal internal bore 58 of connecting spool 51, bracket 31 will also be rotated, to rotate mirror head 25. Spring 79 continuously biases pulley 59 in the direction as indicated by arrow 82, and if knob 95 is released, mirror head 25 will be returned to its set position. If knob 95 is rotated manually, and it is desired to keep mirror 25 in the position to which it has been rotated, knob 95 can be pulled away from control mechanism housing 88, against the bias of spring 93, whereupon adjacent teeth of sprocket 91 slide over locking screw 101. Thus, knob 95 and mirror head 25 will be locked into the desired position. When it is desired to return mirror head 25 to its set position, knob 95 can be pushed or slapped toward housing 88 of control mechanism 86, whereupon mirror 25 will be free to rotate to its set position under the influence of spring 79.

When it is desired to adjust the set position of mirror head 25, cap screw 85 (FIG. 5) is removed from annular side wall 48 of servo mechanism housing 46, a tool is inserted through aperture 84 to engage and loosen set screw 61, whereupon connecting spool 51 is free to rotate with respect to pulley 59. When mirror head 25 has been adjusted as desired, set screw 61 is retightened, the tool withdrawn from housing 46, and cap screw 85 reinserted in aperature 84 of housing 46. A similar adjustment can be made from inside the cab of the truck by merely rotating fine adjusting screw 102.

The arrangement of spring 79 and stop protrusions 64 and 65 within servo mechanism 45 is such that the continuous torque or twisting forces exerted by spring 79 are not felt by connecting spool 59, and set screw 61 extending through pulley 59 is merely required to connect pulley 59 to connecting spool 51 without regard to the twisting forces of spring 79. Since stop protrusions 64 and 65 are permanently and rigidly connected to their respective pulley 59 and top wall 49 of housing 46, they will never be jarred out of position, broken or otherwise damaged.

The arrangement of servo mechanism 45 is such that the servo mechanism and frame 15 can be assembled at the point of original manufacture and shipped to the location where the assembly is to be connected to a truck, installed on the truck, and adjusted, without ever having to remove bottom closure cap 77. Thus, housing 46 of servo mechanism 45 can be virtually sealed at the point of manufacture, and the only time the seal of housing 46 will be broken is when cap screw 85 is removed from annular side wall 48 in adjusting the set position of mirror head 25. Of course, since cap screw 85 is replaced in housing 46 after the adjustment function, the seal of housing 46 is reestablished, and the internal working components of servo mechanism 45 will be free from contamination from dust and moisture.

At this point, it should be apparent that the invention disclosed herein is durable and versatile, and effective in providing the driver of a trailer truck with an increased range of vision. The structure is arranged so that as the driver needs to focus on a point behind and to the right of his cab 11, he manipulates knob 95 until he views the desired area, whereupon he pulls knob 95 to lock mirror head 25 in the desired position, and continues to operate his vehicle with both hands. When the driver is finished using the mirror, as when he has backed his vehicle and is ready to move in a forward direction, he merely pushes or slaps knob 95 toward control mechanism housing 88, whereupon mirror head 25 returns to its set position. Thus, mirror head 25 is manipulated with a minimum amount of attention from the driver.

While the structure has been disclosed as usable on the right side of the cab, it should be obvious that a similar structure can be utilized on the left side of the cab, if desired. Furthermore, while U-shaped frame 15 has been disclosed as being constructed in two pieces in order to be adjustable to fit mirror heads of various sizes, it should be obvious that frame 15 can be of one piece construction, if desired.

It will be obvious to those skilled in the art that many chosen for the purpose of illustrating the present invention without departing from the scope thereof as defined by the appended claims.

What is claimed is:

1. In a rear view mirror assembly of the type including a servo mechanism for pivoting the mirror about an upwardly extending axis and a control mechanism for actuating the servo mechanism, the improvement therein of said servo mechanism including a housing, a stud member of non-circular cross sectional configuration connectable to the mirror and extendable into said housing, a pulley member in said housing actuated by said control mechanism. Said pulley member defining a circular central opening, a sleeve insertable into said control opening, said sleeve defining an opening of non-circular configuration mating with the cross sectional shape of said stud member, a set screw means extending from the periphery of the pulley member into engagement with the sleeve, and said housing including an opening alignable with said set screw means.

2. A rear view mirror assembly comprising a mirror head, a servo mechanism for pivoting the mirror head about an upwardly extending axis, a control mechanism for actuating the servo mechanism, and a Bowden wire assembly connecting said servo mechanism and said control mechanism, said control mechanism comprising a housing defining an elongated slot, a rack slidable in said slot, a pinion rotatable adjacent said slot and intersecting the teeth of said rack to move said rack through said slot, said Bowden wire assembly including an outer tube and an inner wire, said rack including a set screw for connecting said inner wire to said rack, said control mechanism housing defining an opening alignable with the set screw of the rack so that said set screw can be reached from outside the housing, and said housing including a set screw for connecting the outer tube of said Bowden wire to the housing.

3. In a rear view mirror assembly of the type including a mirror pivotal about an upwardly extending axis, a servo mechanism for controlling the pivotal movement of the mirror and including spring means for pivoting the mirror to a set position, and a wire connected to the servo mechanism, the improvement comprising a control mechanism including a housing having a slot therein, a rack connectable to the wire and movable in said slot away from one end of said slot against the bias of the spring means, and means for connecting said rack to the wire from outside said housing when said rack is adjacent said one end of said slot.

4. The invention of claim 3 wherein said means for connecting said rack to said slot comprises a set screw threaded into said rack and engaging the wire, and an opening defined in said housing and alignable with said set screw when said rack is positioned adjacent said one end of slot slot.

5. A rear view mirror structure including a U-shaped frame having a side upwardly extending leg and upper and lower laterally extending legs, said side leg being adjustable in length, and said legs being arranged to partially surround a mirror, a bracket for grasping a mirror and including a non-circular stud, a servo mechanism being positioned below said lower leg and including a non-circular socket for grasping said stud and rotating said bracket, and said bracket being positioned above said lower leg with its stud extending through said lower leg and into said servo mechanism.

6. In a rear view mirror assembly of the type including a mirror pivotal about an upwardly extending axis and mountable outside a vehicle, a servo mechanism connected to the mirror and including spring means urging the mirror to a predetermined position, and a control mechanism mountable inside a vehicle for controlling the servo mechanism, the improvement comprising said control mechanism including means for altering the predetermined position of the mirror.

7. A support assembly for a rear view mirror comprising a U-shaped support frame including an upwardly extending leg and spaced upper and lower laterally extending legs, a support bracket for attachment to a mirror head and including a stud of non-circular cross section rigidly connected thereto, a servo mechanism housing connected to the lower surface of said lower laterally extending leg, an aperture defined in the lower laterally extending leg and opening into said servo mechanism housing, a connecting spool extending through the aperture of said laterally extending leg and into said servo mechanism housing and defining a non-circular opening sized and shaped to receive the stud of said support bracket, a pulley surrounding said connecting spool, a set screw connecting together said pulley and connecting spool, spring means connected to said servo mechanism housing and to said pulley and arranged to bias said pulley in a first rotational direction about said connecting spool, a first stop protrusion extending rigidly inwardly from said servo mechanism housing toward said pulley and a second stop protrusion extending from said pulley and engageable with said first stop protrusion to limit the rotational movement of said pulley.

References Cited

UNITED STATES PATENTS

| | | | |
|---|---|---|---|
| 3,119,591 | 1/1964 | Malecki | 74—501X |
| 3,238,800 | 3/1966 | McCord | 74—98 |
| 3,261,226 | 7/1966 | Dent | 74—96X |
| 3,277,678 | 10/1966 | Booth | 74—98 |
| 3,439,555 | 4/1969 | Rech | 74—501 |

FRED C. MATTERN, JR., Primary Examiner

F. D. SHOEMAKER, Assistant Examiner

U.S. Cl. X.R.

74—501; 248—283, 486, 488